Figure 1:
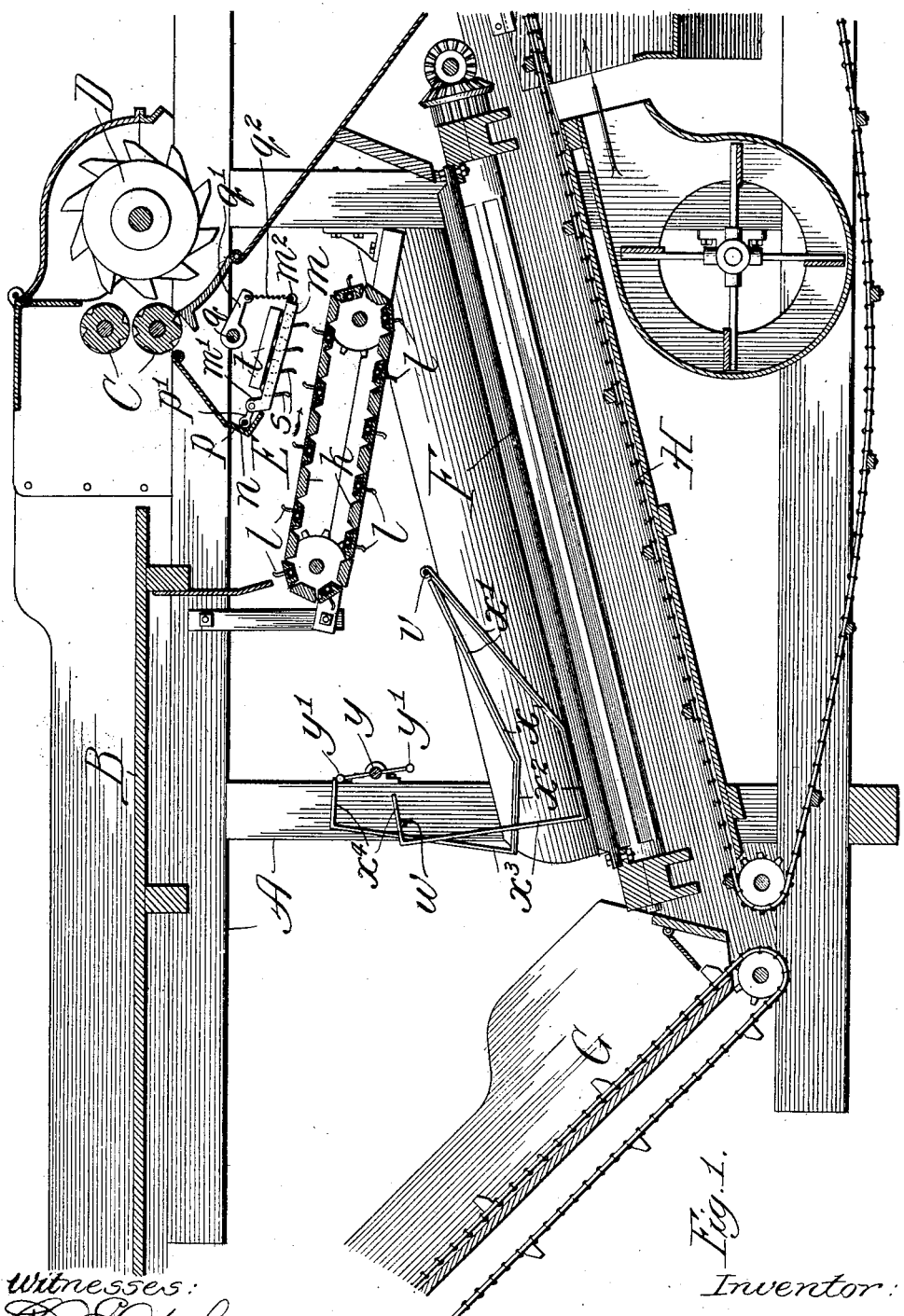

No. 762,523. PATENTED JUNE 14, 1904.
J. E. GOODHUE.
CORN HUSKING MACHINE.
APPLICATION FILED JAN. 18, 1904.
NO MODEL. 4 SHEETS—SHEET 1.

Witnesses:
Inventor:
James E. Goodhue,
By Dyrenforth, Dyrenforth and Lee
Att'ys

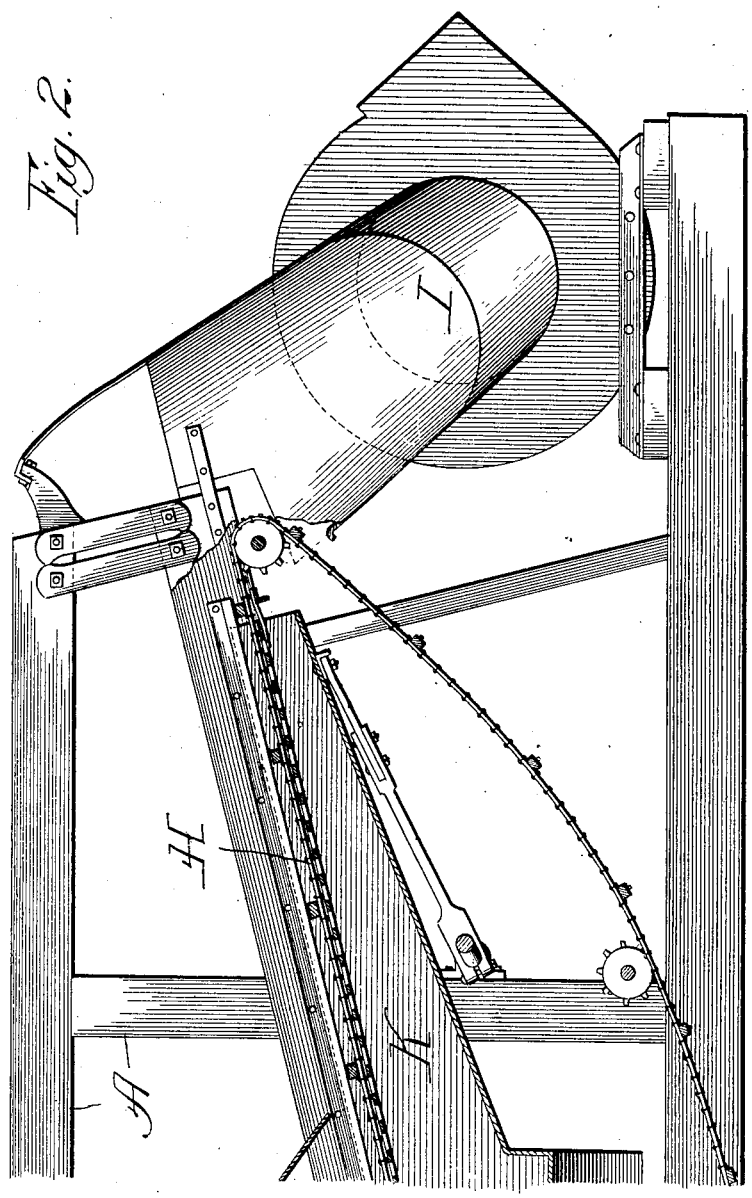

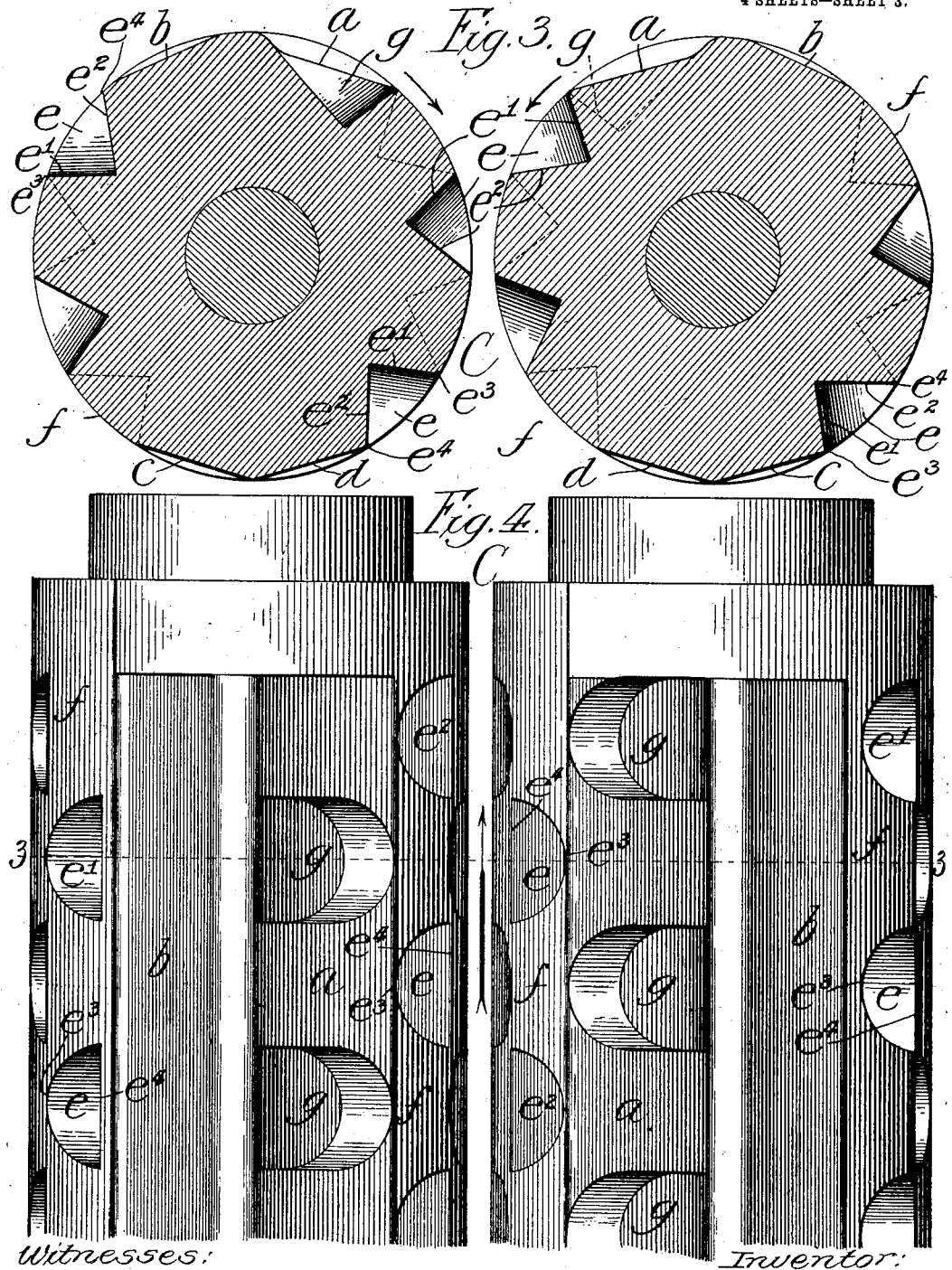

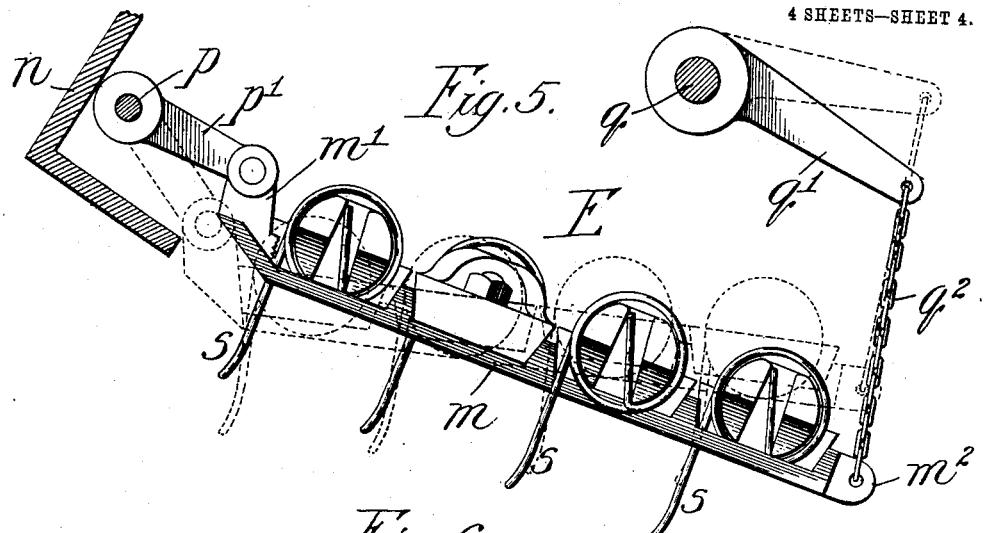
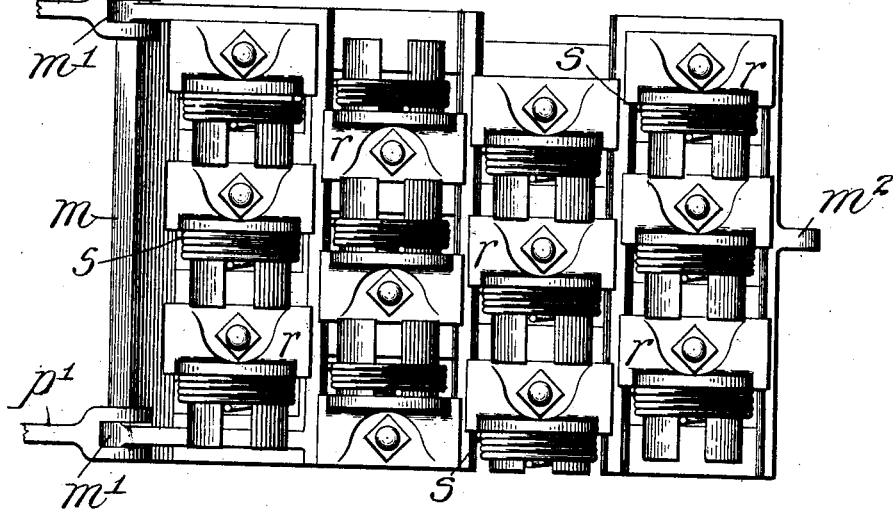
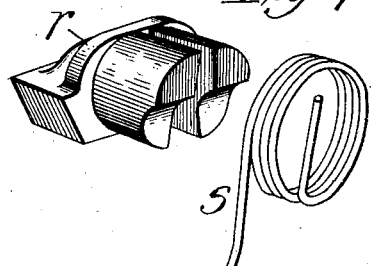

No. 762,523. Patented June 14, 1904.

UNITED STATES PATENT OFFICE.

JAMES E. GOODHUE, OF ST. CHARLES, ILLINOIS.

CORN-HUSKING MACHINE.

SPECIFICATION forming part of Letters Patent No. 762,523, dated June 14, 1904.

Application filed January 18, 1904. Serial No. 189,501. (No model.)

*To all whom it may concern:*

Be it known that I, JAMES E. GOODHUE, a citizen of the United States, residing at St. Charles, in the county of Kane and State of Illinois, have invented a new and useful Improvement in Corn-Husking Machines, of which the following is a specification.

This invention is in the nature of an improvement upon a cornstalk-chopping and ear snapping and husking machine shown and described in Letters Patent No. 683,174, granted to me September 24, 1901, and No. 739,540, granted to me September 22, 1903.

In the operation of the machine, briefly stated, the cornstalks with the ears upon them are fed upon a table or the like and advanced thereon to pass butt-end first between snapping-rollers to rotating chopping-knives, which chop the stalks into feed in the usual manner. The ears torn from the stalks by the snapping-rollers fall upon husk-loosening mechanism, whence they are discharged upon husk-removing mechanism. The husked ears are discharged from one part of the machine and the husks and feed from another part. Means are also provided for cleaning and saving any kernels of corn that have been shelled from the cobs in the husking operation.

My present objects are, first, to provide snapping-rollers of an improved construction which will readily engage and advance the stalks between them and snap or pinch off the ears of corn in a manner to prevent such injury to the latter as would tend to loosen kernels upon the cobs; second, to provide husk-loosening mechanism which may be readily adjusted to loosen the husks of ears without to a material extent, at least, loosening kernels thereof, and, third, to provide improved means for maintaining the ears in contact with the husk-removing mechanism while the ears are being operated upon thereby.

It is desirable in order to prevent clogging of the snapping-rollers that the stalks shall travel through the latter in approximately parallel lines. As the stalks are fed upon the table, however, some of them are apt to have broken ends which extend parallel with the rollers, so that they cannot be engaged thereby, and thus clog the machine and retard the movement of other stalks.

In the present machine I have provided snapping-rollers of an improved construction which are capable of grasping the butts of stalks of any size and also broken laterally-extending lengths thereof to insure their rapid passage between the rollers and which will pinch off the ears without loosening the kernels. The importance of this latter feature is quite material, because it is well understood that a husking-machine to perform its functions in a manner considered perfect should leave all the kernels upon the cobs and that a machine which has a tendency to shell the corn to any material extent is undesirable.

In order that husk-loosening mechanism shall operate in a satisfactory manner in a machine of this class, it is desirable that it shall be capable of adjustment to meet the varying conditions of the ears. To illustrate: Corn that has ripened early in the season, and more especially under dry atmospheric conditions, husks and shells readily. Corn that ripens later in the season or under atmospheric conditions less dry is harder to husk and shells less readily, while corn which for any reason has been harvested before maturity is still harder to husk and the kernels have a comparatively tight hold upon the cob. The improved husk-loosening mechanism I provide in the present machine is adjustable to meet the conditions named and perform the loosening operation in a satisfactory manner without loosening kernels to any material extent.

It frequently happens while ears are moving down the husking-rollers that a pull upon the husk or silk by the rollers in breaking the same will cause the ears when freed to jump toward the discharge end of the machine and escape before the husking operation has been completely performed. To obviate this difficulty, I provide means in the form of oscillating beaters, which tend to throw ears that jump as described back against the husking-rollers, whereby the husking thereof may be completed before they are discharged from the machine.

Referring to the drawings, Figures 1 and 2 taken together show a broken longitudinal section through the machine and illustrate the working parts embodying my present improvements; Fig. 3, an enlarged section, taken on line 3 in Fig. 4, through my improved snapping-rollers; Fig. 4, a broken view of the snapping-rollers; Fig. 5, an enlarged section through the relatively stationary member of the husk-loosening mechanism; Fig. 6, a top plan view of the same, and Fig. 7 enlarged detail perspective views of a husk-loosening finger and its attaching means.

A is the frame of the machine; B, the feeding-table; C, the companion snapping-rollers; D, the rotating feed-chopper; E, the husk-loosening mechanism; F, the husk-removing mechanism; G, a discharging-elevator for the husked ears; H, traveling conveyer movable beneath the husking-rollers to receive the husks and silk and movable beneath the feed-chopper to receive the feed and discharging into a fan-conveyer I, which discharges the mixed chopped feed, husks, and silk, and K means for sifting out and saving any kernels of corn that may have been shelled from the cobs during the husking operation.

The general plan and operation of my machine is substantially like that shown in my aforesaid patent, No. 739,540. I shall therefore describe specifically only those parts which involve my present improvements.

As shown in Figs. 3 and 4, the snapping-rollers are constructed alike and coöperate in advancing the cornstalks and snapping off the ears. At one side of each roller is a longitudinally-extending cam-surface $a$. The roller also presents the flat surfaces $b$ $c$ $d$; but these are merely for convenience in casting the rollers to enable them to be readily withdrawn from the sand and are somewhat more effective in advancing stalks between the rollers than if left round. Between the surfaces $a$ $d$ on one side and $b$ $c$ on the opposite side of each roller are longitudinal series of pits or pockets $e$, formed with circular sides $e'$ and flat sides $e^2$. At the circumferential face of the roller the side $e'$ presents a nearly semicircular pinching edge $e^3$ and the surface $e^2$ a straight pinching edge $e^4$. The pits or pockets of one longitudinal series are staggered with relation to the next series, as clearly shown in the drawings, and the roller-surfaces $f$ between the flat surfaces present convex faces where they are unprovided with the pits or pockets. In the cam-surfaces $a$ are deep pockets $g$, alternating with each other in the rollers, as shown. The rollers are disposed with relation to each other as shown and rotate as indicated by the arrows in Fig. 3. Thus in their rotation the surface $a$ of one roller registers at the bite with the corresponding surface $a$ of the other roller at opposite sides of its pockets $g$. The pits or pockets $e$ of the rollers register at the bite with the parts of the surface $f$ of the other roller between the pockets thereof.

The pits or pockets $e$ are formed of a depth or size whereby the butt-end of a cornstalk of ordinary size may be readily received and engaged between them and the adjacent smooth surface of the other roller. The larger pockets $g$, with the surfaces $a$, will grasp the butts of very large stalks. A cornstalk pressed at its butt-end toward the bite of the rollers in position, for example, to be engaged by the pocket $e$ at the upper right and inner side in Fig. 3 will be forced to the straight surface $e^2$ thereof and in the rotation of the rollers will be engaged and squeezed by the edge $e^3$ of the same pocket against the smooth surface $f$ of the other roller. The rollers thus get a firm hold upon the stalk and draw it through the bite, the cam-surfaces and pockets in the same circumferential line around the rollers operating successively to grip and engage the stalk to advance it. When an ear upon the stalk is reached, its stem will be engaged either by a pinching edge $e^3$ of one of the pockets $e$ or by the edge of a pocket $g$, the surfaces beyond said edges operating as cams to press the bases of the ears in the outer direction, and thus snap off the stems some distance from the ears without removing the husks that grow from the extreme base thereof. The coarse husks growing on the stems pass through the rollers. As there is no contact between the rollers and ears beyond the base portions of the latter, the ears are not squeezed, and the kernels are not loosened on the cobs. In the event that parts of the stalks extend in a very slanting direction or in a direction nearly longitudinal with relation to the rollers and in a manner which precludes gripping of their butt-ends by the pockets the cam-surfaces $a$ will engage and drag them into the bite of the rollers and feed them through.

In the husk-loosening mechanism E, $k$ is a traveling endless apron, preferably formed of a series of parallel slats alternately plane and carrying yielding fingers $l$. The construction is substantially the same as in my last aforesaid patent, except that for the purpose of shortening the machine and rendering it more compact the belt slants and runs in an opposite direction and extends over instead of from one end of the husking-rollers above and approximately parallel with the traveling apron device $k$, adjacent lying frames $m$, each provided along one edge with bearing-ears $m'$. In the position shown in Fig. 1 is a cross-extending angle-iron strip or shield $n$, which houses a cross-extending rod $p$, provided with pivotal links $p'$, pivotally engaging the ears $m'$. Extending parallel with the rod $p$ above the frame $m$ is an adjustable shaft $q$, carrying arms $q'$, connected by chains or the like $q^2$ with ears $m^2$ on the edge of the frames $m$ opposite that provided with the ears $m'$. Thus the frames $m$ may rest at their higher ends on the stop formed by the angle-iron $n$ and are loosely suspended at their lower ends from the shaft $q$. They may be raised or lowered at their rear ends by turning the shaft $q$ and will yield in an upper direction at either end. Each frame $m$, between its outer rails, is formed with series of sockets and attaching-ribs for attachments $r$, carrying spring-fingers $s$. The attachments $r$ are removably fastened by screws or bolts to the ribs, whereby the spring-fingers $s$ may be provided or not, as desired. Ears snapped from the stalks by the rollers C fall upon the apron $k$, are engaged by the spring-fingers $l$ thereon, and move, as indicated by the arrow, in a backward direction beneath the frames $m$. The ears of corn from a particular field being harvested at the same time and under the same conditions would run substantially equal with regard to the conditions of their husks and kernels. If they are in a condition of being hard to husk and shell, the frame $m$ may be provided with all its fingers $s$ and a weight $t$ may be placed upon the frame to resist to the desired degree the upward yielding thereof. Thus in the husk-loosening operation the fingers will obtain a strong grip upon the husks and tear them as desired without having force enough to loosen kernels upon the cob. In operating upon ears less difficult to husk the weight $t$ may be removed from the frame $m$. In the more extreme cases where husks are readily removable and the kernels easy to shell the fingers $s$ of the frames $m$ may be removed altogether, so that the ears will only be retarded by the frictional engagement of the frames on one side while the yielding fingers $l$ of the apron $k$ advance them and loosen the husks. In this way ears in any condition may be acted upon to have their husks loosened without danger of shelling the kernels to any material extent.

In the position shown is a rod or shaft $v$, extending across the frame over the husking-rollers F. A rod $w$ also extends across the frame in the position shown. Hinged at one end to the rod $v$ are beaters $x$, presenting the inclined surfaces $x'$ and surfaces $x^2$, which when the beaters are at the lowest positions extend parallel with the rollers F. The beaters consist of comparatively narrow strips of metal or other suitable material, and they are formed with upper projecting arms $x^3$ at their rear ends, having forward-extending flanges or shoulders $x^4$ at their upper ends. A rotary shaft $y$ in the position shown carries cranks or fingers $y'$, which in the rotation of the shaft $y$ engage the under surface of the shoulders $x^4$ and then release the same. Thus in operation the beaters shown are raised and dropped alternately by the cranks $y'$, the distance of their downward movement being limited by the rod or stop $w$. A beater of sufficient width may be provided over each pair of husking-rollers F, or several comparatively narrow beaters may be thus provided. When ears of corn that are being acted upon by the husking-rollers jump, as before explained, they impact against a surface $x'$ and are deflected and beaten down against the rollers to be further husked.

Various modifications in the matter of details of construction may be provided without departing from the spirit of my invention as defined by the claims.

What I claim as new, and desire to secure by Letters Patent, is—

1. In combination, a pair of snapping-rollers provided with longitudinally-extending coöperating cam-surfaces, series of peripheral pockets, at opposite sides of said surfaces, of a size capable of admitting the butt-ends of cornstalks, but not the ears thereof, and series of similar stalk-engaging pockets in the cam-surfaces, substantially as and for the purpose set forth.

2. In a corn-husking machine, the combination with inclined coöperative husking-rollers of a beater comprising a strip having a forward inclined beater-surface $x'$ and rear beater-surface $x^2$, and pivotally supported at its forward end above the rollers, a rotating crank operating against the opposite end of the beater to raise and release the same intermittingly whereby in each operation it falls toward the said rollers and a stop in the path of the beater limiting its downward movement, substantially as and for the purpose set forth.

JAMES E. GOODHUE.

In presence of—
WALTER N. WINBERG,
L. HEISLAR.